United States Patent
Hikone et al.

(10) Patent No.: US 11,187,439 B2
(45) Date of Patent: Nov. 30, 2021

(54) HEAT SOURCE SYSTEM

(71) Applicant: Mitsubishi Electric Corporation, Tokyo (JP)

(72) Inventors: Takahito Hikone, Tokyo (JP); Takuya Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 118 days.

(21) Appl. No.: 16/494,488

(22) PCT Filed: Jun. 8, 2017

(86) PCT No.: PCT/JP2017/021342
§ 371 (c)(1),
(2) Date: Sep. 16, 2019

(87) PCT Pub. No.: WO2018/225221
PCT Pub. Date: Dec. 13, 2018

(65) Prior Publication Data
US 2020/0096238 A1    Mar. 26, 2020

(51) Int. Cl.
*F25B 13/00* (2006.01)
*F25B 29/00* (2006.01)
(Continued)

(52) U.S. Cl.
CPC ............ *F25B 13/00* (2013.01); *F25B 29/003* (2013.01); *F24F 5/00* (2013.01); *F25B 1/00* (2013.01);
(Continued)

(58) Field of Classification Search
CPC .......... F25B 13/00; F25B 29/003; F25B 1/00; F25B 49/02; F25B 2313/0231;
(Continued)

(56) References Cited

FOREIGN PATENT DOCUMENTS

| JP | 2001-241735 A | 9/2001 |
| JP | 2002-098358 A | 4/2002 |

(Continued)

OTHER PUBLICATIONS

Ishida et al., Air Conditioning System, Feb. 24, 2014, JP2014035092A, Whole Document (Year: 2014).*

(Continued)

*Primary Examiner* — Larry L Furdge
(74) *Attorney, Agent, or Firm* — Posz Law Group, PLC

(57) ABSTRACT

A heat source system includes heat source apparatuses each with refrigerant circuit and water heat exchanger. A water supply header pipe merges and supplies, to a load, water flowing in from the heat exchangers. A water return header pipe splits, into the heat exchangers, water flowing in from the load. Pumps feed water to the heat exchangers. A bypass pipe with bypass valve connects the supply and return header pipes. A differential pressure gauge measures a water pressure difference between supply and return. A controller determines the number of heat source apparatuses to operate, from heat generated by refrigerant circuits and heat required, determines whether an operating frequency of the pump connected to a heat source apparatus to be operated is a minimum frequency, and controls the pump operating frequency and/or an opening degree of the bypass valve such that the water pressure difference falls within a target range.

3 Claims, 8 Drawing Sheets

(51) Int. Cl.
*F24F 5/00* (2006.01)
*F25B 1/00* (2006.01)
*F25B 49/02* (2006.01)

(52) U.S. Cl.
CPC ....... *F25B 49/02* (2013.01); *F25B 2313/0231* (2013.01); *F25B 2313/02741* (2013.01); *F25B 2339/047* (2013.01)

(58) Field of Classification Search
CPC ...... F25B 2313/02741; F25B 2339/047; F25B 2600/0253; F25B 2400/06; F25B 2700/21173; F25B 2700/21161; F25B 2313/003; F25B 2313/0312; F25B 2313/0314; F24F 5/00; F24F 2221/54; F24F 2140/12; F24F 11/85; F24F 11/84; F24F 11/46; Y02B 30/70; Y02B 30/12; F24D 19/1039; F24D 3/18
See application file for complete search history.

(56) References Cited

FOREIGN PATENT DOCUMENTS

| JP | 2005-127586 | A | | 5/2005 |
|---|---|---|---|---|
| JP | 2005127586 | A | * | 5/2005 |
| JP | 2005-299980 | A | | 10/2005 |
| JP | 2011-153809 | A | | 8/2011 |
| JP | 2014035092 | A | * | 2/2014 |

OTHER PUBLICATIONS

Suzuki et al., Primary Pump Type Heat Source Variable Flow Rate Control System . . . , May 19, 2005, JP2005127586A, Whole Document (Year: 2005).*

International Search Report of the International Searching Authority dated Aug. 22, 2017 for the corresponding international application No. PCT/JP2017/021342 (and English translation).

* cited by examiner

HEAT SOURCE SYSTEM

CROSS REFERENCE TO RELATED APPLICATION

This application is a U.S. national stage application of PCT/JP2017/021342 filed on Jun. 8, 2017, the contents of which are incorporated herein by reference.

TECHNICAL FIELD

The present invention relates to a heat source system configured to generate cool water and hot water by cooling and heating water by refrigerant circulating through a refrigerant circuit.

BACKGROUND ART

Air-cooled heat pump chillers configured to generate cool water and hot water by cooling and heating water include a simplex pump system including a pump on a heat source apparatus side, and a duplex pump system including a pump not only on the heat source apparatus side but also on a water supply header pipe.

An example of the duplex pump system is disclosed in Patent Literature 1. Patent Literature 1 describes, as an example of a method of determining the number of heat source apparatuses to be operated, a method of measuring a flow rate of water supplied from a water supply header to a load and a flow rate of water returning from the load to a water return header, and of increasing or decreasing the number of heat source apparatuses according to a difference between the flow rates. Patent Literature 1 also discloses providing a pressure sensor at a primary water supply header, and controlling the number of heat source apparatuses by using a measurement value of the pressure sensor. Patent Literature 1 further discloses controlling an opening degree of a bypass valve by using the measurement value of the pressure sensor provided at the primary water supply header, to adjust a water pressure difference between a water supply side and a water return side.

CITATION LIST

Patent Literature

Patent Literature 1: Japanese Unexamined Patent Application Publication No. 2011-153809

SUMMARY OF INVENTION

Technical Problem

With a heat source control system disclosed in Patent Literature 1, at the time of installing the system, work of attaching the pressure sensor to the primary water supply header is required to be performed at the site. As a result, not only a work space for a worker to attach the pressure sensor to the primary water supply header is required, an installation cost of the system is increased due to the attachment task for the pressure sensor. This problem also arises in a case of attaching, instead of the pressure sensor, a flowmeter for water to be supplied to the load and a flowmeter for water returning from the load to the water return header.

The present invention has been made to solve problems as described above, and provides a heat source system capable of suppressing an installation cost of the system, and of finely adjusting a water pressure difference between a water supply side and a water return side.

Solution to Problem

A heat source system according to an embodiment of the present invention includes: a plurality of heat source apparatuses including a refrigerant circuit including a water heat exchanger; a water supply header pipe, connected to a load and a plurality of the water heat exchangers by water pipes, and configured to merge and supply, to the load, water flowing in from the plurality of water heat exchangers; a water return header pipe, connected to the load and the plurality of water heat exchangers by water pipes, and configured to split, into the plurality of water heat exchangers, water flowing in from the load; a plurality of pumps, provided on the water pipes connecting the plurality of water heat exchangers and the water return header pipe, and configured to feed water to the plurality of water heat exchangers; a bypass pipe configured to connect the water supply header pipe and the water return header pipe; a bypass valve provided on the bypass pipe; a differential pressure gauge configured to measure a water pressure difference between pressure of water supplied to the load from the water supply header pipe and pressure of water returning from the load to the water return header pipe; and a controller configured to control the plurality of heat source apparatuses and the plurality of pumps, wherein the controller includes a number control unit for apparatuses configured to determine the number of heat source apparatuses to be operated, among the plurality of heat source apparatuses, from an amount of heat generated by the plurality of refrigerant circuits and an amount of heat required, and a water pressure control unit configured to determine whether or not an operating frequency of the pump connected to the heat source apparatus determined by the number control unit for apparatuses is a minimum frequency of rated frequencies, and control, according to a result of determination, one of the operating frequency of the pump and an opening degree of the bypass valve such that the water pressure difference falls within a target range.

Advantageous Effects of Invention

According to an embodiment of the present invention, one of the operating frequency of the pump and the opening degree of the bypass valve may be selected as a device that adjusts the water pressure difference between a water supply side and a water return side, and also, since the number of heat source apparatuses to be operated is determined from the amount of heat required, an unnecessary sensor is not required to be provided. As a result, an increase in an installation cost for the system may be suppressed, and also, the water pressure difference between the water supply side and the water return side may be finely adjusted.

DESCRIPTION OF EMBODIMENTS

Embodiment 1

Figure 1:
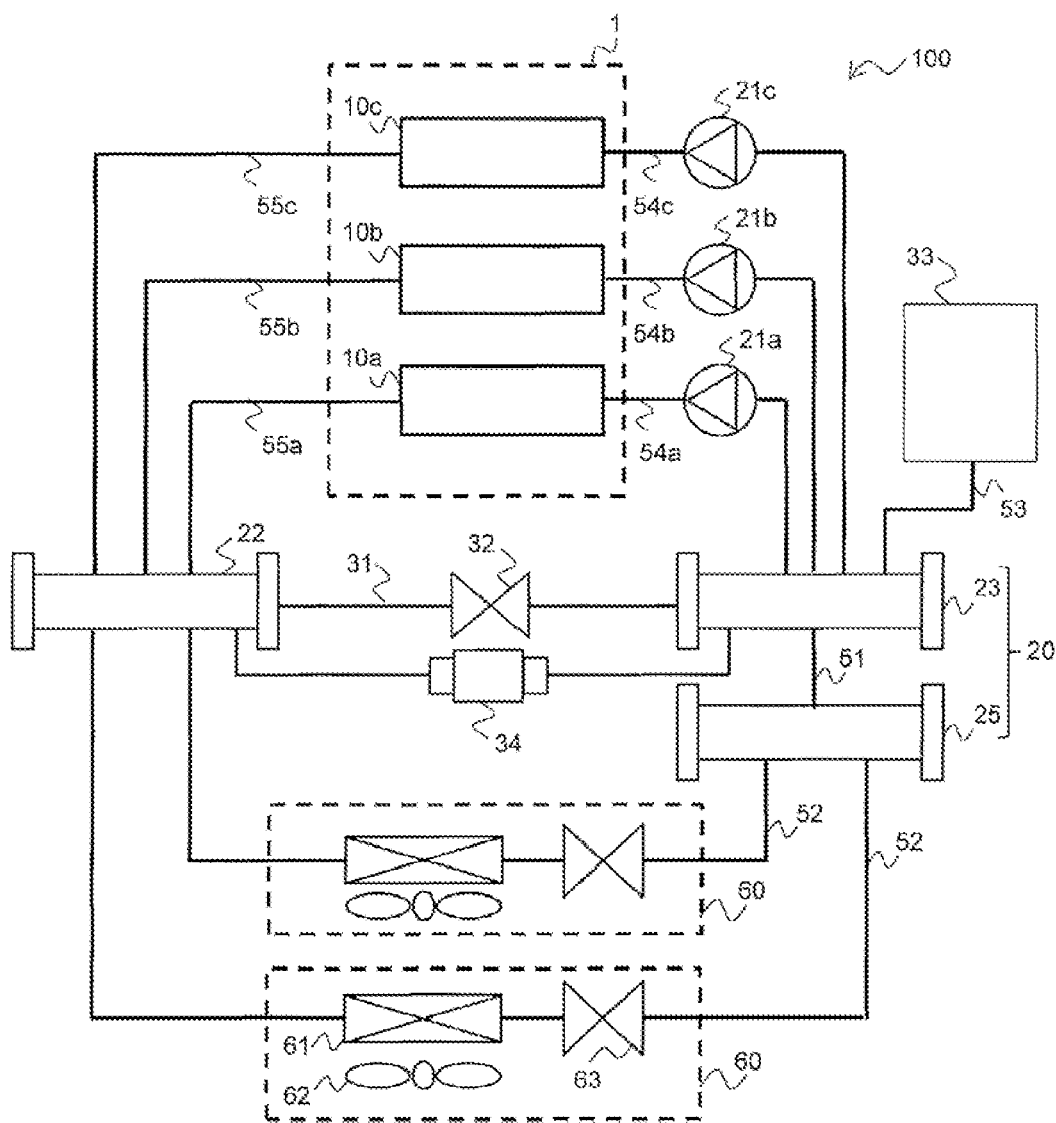
FIG. 1 is a schematic diagram showing an example configuration of a heat source system according to Embodiment 1 of the present invention.

A configuration of a heat source system of Embodiment 1 will be described. FIG. 1 is a schematic diagram showing an example configuration of the heat source system according to Embodiment 1 of the present invention. In Embodiment 1, a description will be given on a case of a simplex pump system provided with a pump on the heat source apparatus side.

A heat source system 100 shown in FIG. 1 includes a refrigeration cycle apparatus 1, a water supply header pipe 22, a water return header pipe 20, and a tank 33. The refrigeration cycle apparatus 1 is an example of an air-cooled heat pump chiller. The refrigeration cycle apparatus 1 includes a plurality of heat source apparatuses 10a, . . . , 10c. Each of the heat source apparatuses 10a, . . . , 10c is connected to loads through the water supply header pipe 22 and the water return header pipe 20.

The heat source apparatuses 10a, . . . , 10c are each connected to the water supply header pipe 22 through a corresponding one of water pipes 55a, . . . , 55c. The heat source apparatuses 10a, . . . , 10c are each connected to the water return header pipe 20 through a corresponding one of water pipes 54a, . . . , 54c. A pump 21a that feeds water from a water return header pipe 23 to the heat source apparatus 10a is provided on the water pipe 54a. A pump 21b that feeds water from the water return header pipe 23 to the heat source apparatus 10b is provided on the water pipe 54b. A pump 21c that feeds water from the water return header pipe 23 to the heat source apparatus 10c is provided on the water pipe 54c.

The water return header pipe 20 includes the water return header pipe 23 connected to the heat source apparatuses 10a, . . . , 10c, and a water return header pipe 25 connected to the loads. The water return header pipe 23 and the water return header pipe 25 are connected by a water pipe 51. The tank 33 that stores water is connected to the water return header pipe 23 through a water pipe 53. The tank 33 is an open tank. The water supply header pipe 22 merges, and supplies to the loads, water flowing in from the water pipes 55a, . . . , 55c. The water return header pipe 23 splits water flowing in from the loads into the water pipes 54a, . . . , 54c.

In the example configuration shown in FIG. 1, the loads are two fan coil units 60. The fan coil unit 60 is provided on a water pipe 52 connecting the water supply header pipe 22 and the water return header pipe 25. The fan coil unit 60 includes a heat exchanger 61, a fan 62, and an on-off valve 63. The on-off valve 63 is a two-way valve. Water flowing from the water supply header pipe 22 into the fan coil unit 60 through the water pipe 52 exchanges heat with air at the heat exchanger 61, and then returns to the water return header pipe 25 through the water pipe 52.

The water return header pipe 23 and the water supply header pipe 22 are connected by a bypass pipe 31. A bypass valve 32 that adjusts a pressure difference between a water pressure at the water return header pipe 23 and a water pressure at the water supply header pipe 22 is provided on the bypass pipe 31. The bypass valve 32 switches from an open state to a closed state. In the open state, an opening degree of the bypass valve 32 may be changed within a range between a maximum opening degree and a minimum opening degree. A differential pressure gauge 34 is provided between the water return header pipe 23 and the water supply header pipe 22, in parallel with the bypass pipe 31. The differential pressure gauge 34 measures a water pressure difference between water supplied from the water supply header pipe 22 to the load and water returning from the load to the water return header pipe 20.

Additionally, in Embodiment 1, a description is given on a case where the refrigeration cycle apparatus 1 includes three heat source apparatuses 10a, . . . , 10c, but the number of heat source apparatuses is not limited to three so long as it is two or more. Furthermore, in Embodiment 1, a description is given on a case where the load is the fan coil unit 60, but the load is not limited to the fan coil unit 60. The load may be an air handling unit. The number of loads is not limited to two. Positions of the pumps 21a, . . . , 21c are not limited to those shown in FIG. 1 so long as the pumps 21a, . . . , 21c are provided on downstream sides of the heat source apparatuses 10a, . . . , 10c relative to direction of flow of water circulating through the water pipes.

The pumps 21a, . . . , 21c may each be provided at a corresponding one of the heat source apparatuses 10a, . . . , 10c.

Furthermore, in FIG. 1, the differential pressure gauge 34 is provided between the water return header pipe 23 and the water supply header pipe 22, but a position of the differential pressure gauge 34 is not limited to that shown in FIG. 1. The position of the differential pressure gauge 34 is not limited to the position shown in FIG. 1 so long as the differential pressure gauge 34 can measure the water pressure difference between water supplied from the water supply header pipe 22 to the load and water returning from the load to the water return header pipe 20. FIG. 1 shows a configuration of a case where the water return header pipe 20 includes the water return header pipes 23 and 25, but the water return header pipe 25 does not necessarily have to be provided.

Figure 2:
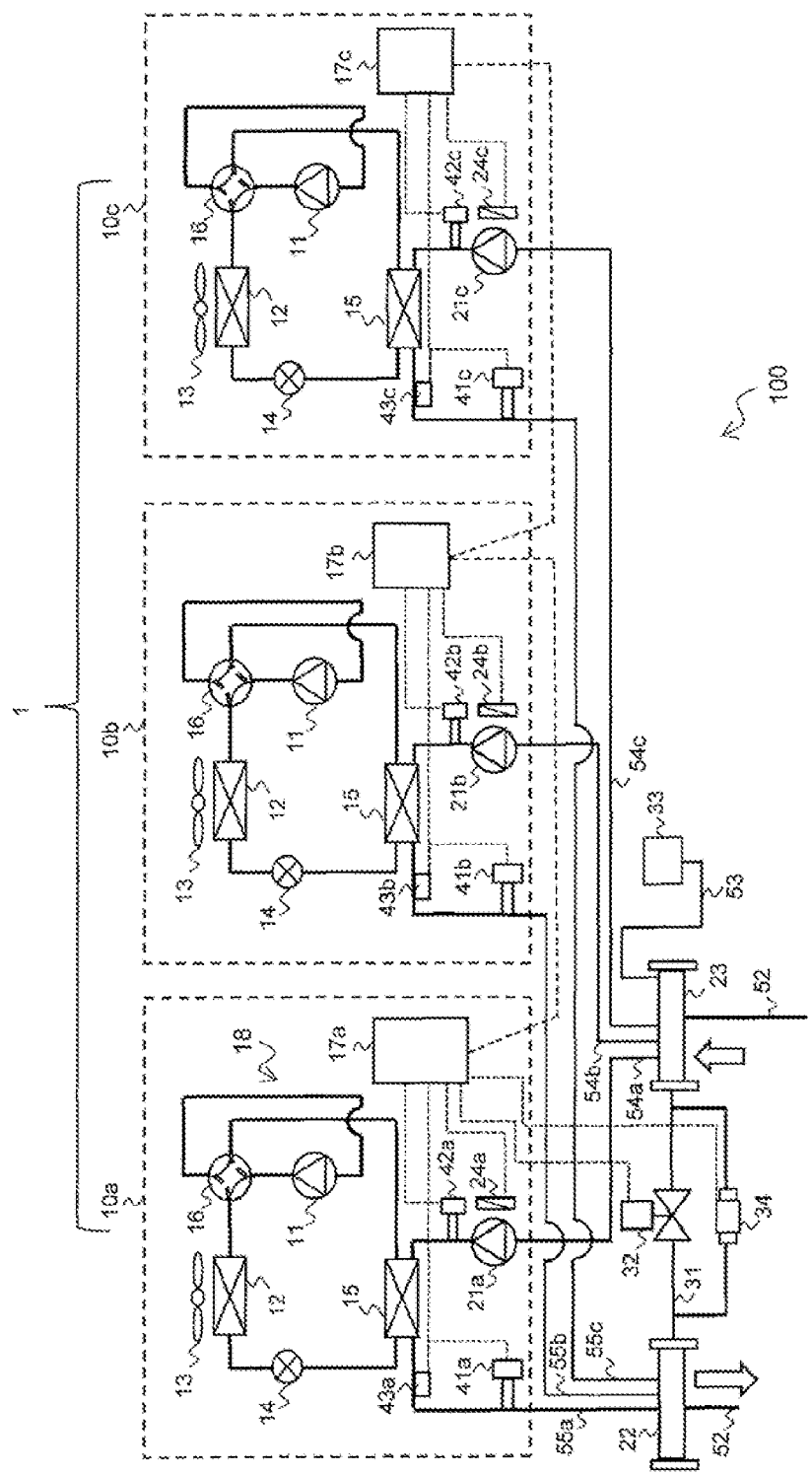
FIG. 2 is a circuit diagram showing an example configuration of the heat source system shown in FIG. 1.

Next, configurations of the heat source apparatuses 10a, . . . , 10c shown in FIG. 1 will be described in detail. FIG. 2 is a circuit diagram showing an example configuration of the heat source system shown in FIG. 1. FIG. 2 shows a case where the pumps 21a, . . . , 21c shown in FIG. 1 are each provided at a corresponding one of the heat source apparatuses 10a, . . . , 10c. The heat source apparatuses 10a, . . . , 10c have similar configurations, and thus, the configuration of the heat source apparatus 10a will be mainly described below, and a description on the heat source apparatuses 10b and 10c will be omitted.

The heat source apparatus 10a includes a compressor 11, a four-way valve 16, an air heat exchanger 12, a fan 13, an expansion valve 14, a water heat exchanger 15, and a controller 17a. A refrigerant circuit 18 includes the compressor 11, the four-way valve 16, the air heat exchanger 12, and the expansion valve 14. The water heat exchanger 15 is connected to the refrigerant circuit 18. Of four connection ports provided in the four-way valve 16, one of two connection ports is connected to a suction port of the compressor 11 and the other is connected to a discharge port of the compressor 11. Of the remaining two connection ports, one connection port is connected to the other connection port through the air heat exchanger 12, the expansion valve 14, and the water heat exchanger 15.

The compressor 11 compresses and discharges refrigerant that is suctioned. The air heat exchanger 12 transfers heat between air and the refrigerant. The four-way valve 16 switches a passage of the refrigerant. The fan 13 supplies outside air to the air heat exchanger 12. The expansion valve 14 adjusts a pressure of the refrigerant, and causes the refrigerant to expand. The water heat exchanger 15 feeds water supplied from the water return header pipe 23, to the water supply header pipe 22, after heat is transferred between the water and the refrigerant.

The water pipes 55a and 54a are connected to the water heat exchanger 15. The water heat exchanger 15 is connected to the pump 21a through the water pipe 54a. An inverter circuit 24a that controls an operating frequency is provided at the pump 21a. The pump 21a operates at an operating frequency within a range of rated frequencies. In the following, a maximum value of the range of the rated frequencies will be referred to as a maximum frequency, and a minimum value as a minimum frequency. An outlet pressure sensor 41a that measures a water pressure, and a temperature sensor 43a that measures a temperature of water are provided on the water pipe 55a on a water outlet side of the water heat exchanger 15. An inlet pressure sensor 42a that measures a water pressure is provided on the water pipe 54a on a water inlet side of the water heat exchanger 15.

Figure 3:
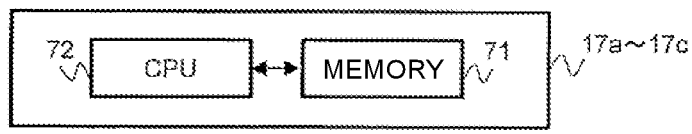
FIG. 3 is a diagram showing an example configuration of each controller provided in a plurality of heat source apparatuses shown in FIG. 2.

FIG. 3 is a diagram showing an example configuration of each controller provided in the plurality of heat source apparatuses shown in FIG. 2. As shown in FIG. 3, the controllers 17a, . . . , 17c each include a memory 71 that stores programs, and a central processing unit (CPU) 72 that performs processes according to the programs.

Figure 4:
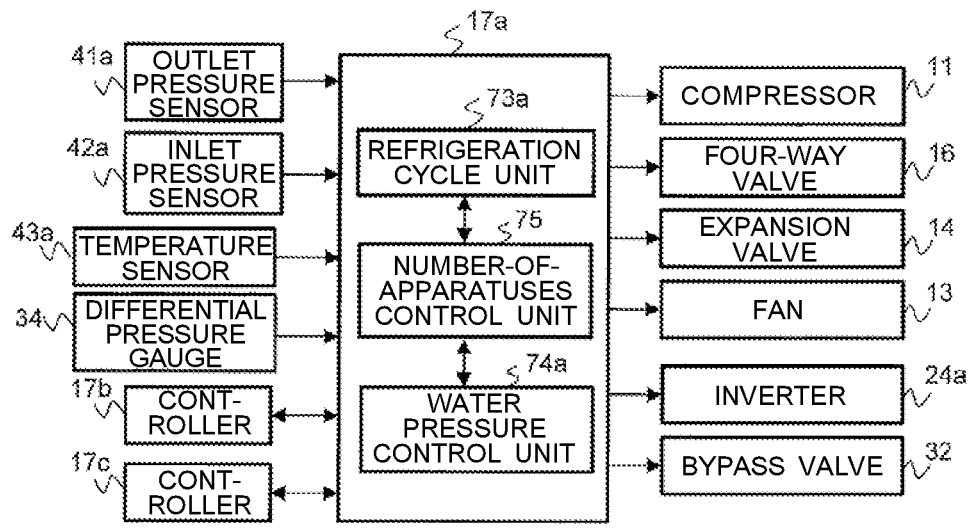
FIG. 4 is a functional block diagram showing an example configuration of the controller provided in one heat source apparatus among the plurality of heat source apparatuses shown in FIG. 2.

FIG. 4 is a functional block diagram showing an example configuration of the controller provided in one heat source apparatus among the plurality of heat source apparatuses shown in FIG. 2. FIG. 4 is a functional block diagram showing an example configuration of the controller 17a provided in the heat source apparatus 10a.

The controller 17a is connected to the compressor 11, the four-way valve 16, the expansion valve 14, and the fan 13 by signal lines. Furthermore, the controller 17a is connected to the outlet pressure sensor 41a, the inlet pressure sensor 42a, the temperature sensor 43a, the bypass valve 32, the differential pressure gauge 34, and the inverter circuit 24a by signal lines. The controller 17a is connected to the controller 17b provided in the heat source apparatus 10b, and the controller 17c provided in the heat source apparatus 10c by signal lines.

The controller 17a includes a refrigeration cycle unit 73a, a water pressure control unit 74a, and a number control unit for apparatuses 75. The refrigeration cycle unit 73a, the water pressure control unit 74a, and the number control unit for apparatuses 75 are implemented by the controller 17a by the CPU 72 performing processes according to the programs. The memory 71 of the controller 17a stores information on a target range of the water pressure difference between the water return header pipe 23 and the water supply header pipe 22. The target range is an allowable range based on a determined target value regarding the water pressure difference. The memory 71 stores information indicating a relationship between the water pressure difference between the water inlet side and the water outlet side of the heat exchanger 15, and a flow rate and the operating frequency of the pump 21a.

When an instruction regarding one of operation states of cooling operation and heating operation is input, the controller 17a transmits information on the operation state to the controllers 17b and 17c. The controller 17a receives information on the operating frequency of the compressor 11 from the controllers 17b and 17c. The controller 17a receives measurement values of temperature sensors 43b and 43c from the controllers 17b and 17c at regular intervals. The controller 17a receives measurement values of outlet pressure sensors 41b and 41c and measurement values of inlet pressure sensors 42b and 42c at regular intervals from the controllers 17b and 17c.

The number control unit for apparatuses 75 estimates the amount of heat generated by each refrigerant circuit 18 of the heat source apparatuses 10a, . . . , 10c, from the operating frequency of each compressor 11 of the heat source apparatuses 10a, . . . , 10c. The number control unit for apparatuses 75 determines the number of operation target heat source apparatuses among the heat source apparatuses 10a, . . . , 10c, from the estimated amount of heat and the amount of heat required for the load. Furthermore, the number control unit for apparatuses 75 calculates the amount of flow rate required for the pump connected to the operation target heat source apparatus, from the measurement value of each sensor among the temperature sensors 43a, . . . , 43c, the outlet pressure sensor 41a, . . . , 41c, and the inlet pressure sensors 42a, . . . , 42c. Then, the number control unit for apparatuses 75 transmits, to the controller provided in the operation target heat source apparatus, operation instruction information including an operation instruction for the heat source apparatus, an operation instruction for the pump, and information on a target flow rate of the pump.

The refrigeration cycle unit 73a controls a refrigeration cycle of the refrigerant circuit 18. When an instruction for operation is received from the number control unit for apparatuses 75, the refrigeration cycle unit 73a switches the passage of the four-way valve 16 according to the operation state including cooling operation and heating operation. The refrigeration cycle unit 73a controls operating frequencies of the compressor 11 and the fan 13 and the opening degree of the expansion valve 14 such that a water temperature measured by the temperature sensor 43a coincides with a target temperature.

When an instruction for operation of the pump 21a is received from the number control unit for apparatuses 75, the water pressure control unit 74a determines the water pressure difference from the measurement values of the outlet pressure sensor 41a and the inlet pressure sensor 42a. The water pressure control unit 74a calculates the flow rate from the determined water pressure difference, and controls the operating frequency of the pump 21a through the inverter circuit 24a such that the calculated flow rate reaches the target flow rate.

Furthermore, the water pressure control unit 74a controls the operating frequency of the pump connected to the operation target heat source apparatus and the opening degree of the bypass valve 32 such that the water pressure difference acquired from the differential pressure gauge 34 falls within the target range. At the time of controlling a water pressure at the bypass pipe 31, the water pressure control unit 74a determines whether or not the operating frequency of the pump in operation is the minimum frequency. In the case where the result of determination indicates that the operating frequency of the pump is not the minimum frequency, the water pressure control unit 74a finely adjusts the water pressure difference at the bypass pipe 31 by controlling the opening degree of the bypass valve 32. In the case where the result of determination indicates that the operating frequency of the pump is the minimum frequency, the water pressure control unit 74a determines whether or not the opening degree of the bypass valve 32 is a minimum opening degree.

In the case where the operating frequency of the pump is the minimum frequency, and the opening degree of the bypass valve 32 is the minimum opening degree, the water pressure control unit 74a finely adjusts the water pressure difference at the bypass pipe 31 by controlling the operating frequency of the pump. On the other hand, in the case where the operating frequency of the pump is the minimum frequency, but the opening degree of the bypass valve 32 is not the minimum opening degree, the water pressure control unit 74a finely adjusts the water pressure difference at the bypass pipe 31 by controlling the opening degree of the bypass valve 32.

Figure 5:
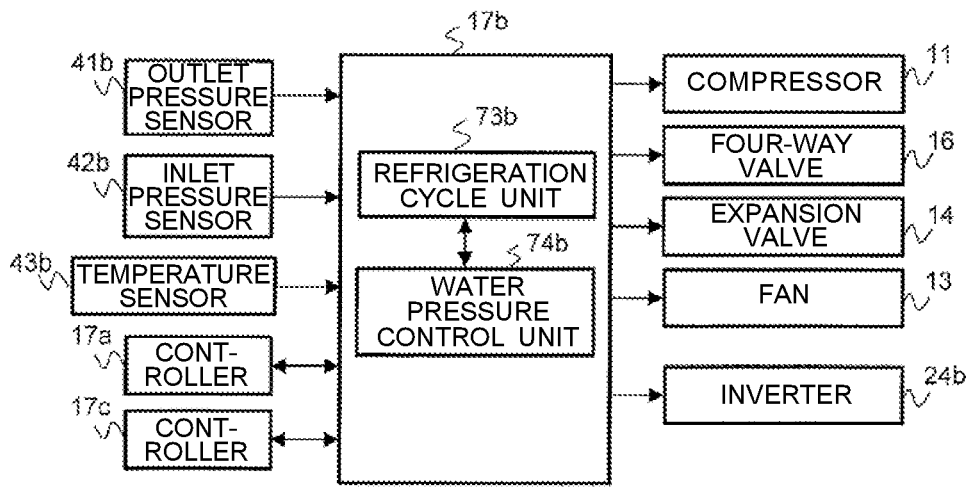
FIG. 5 is a functional block diagram showing an example configuration of the controller provided in a heat source apparatus different from the heat source apparatus provided with the controller shown in FIG. 4.

Next, configurations of the controller 17b and the controller 17c will be described. FIG. 5 is a functional block diagram showing an example configuration of the controller provided in a heat source apparatus different from the heat source apparatus provided with the controller shown in FIG. 4. The controllers 17b and 17c have similar configurations, and thus, the configuration of the controller 17b will be described below.

The controller 17b is connected to the compressor 11, the four-way valve 16, the expansion valve 14, and the fan 13 by signal lines. Furthermore, the controller 17a is connected to the outlet pressure sensor 41b, the inlet pressure sensor 42b, the temperature sensor 43b, and an inverter circuit 24b by signal lines. The controller 17b is connected to the controllers 17a and 17c by signal lines.

The controller 17b includes a refrigeration cycle unit 73b, and a water pressure control unit 74b. The refrigeration cycle unit 73b and the water pressure control unit 74b are implemented by the controller 17b by the CPU 72 performing processes according to programs. The memory 71 of the controller 17b stores information indicating a relationship between the water pressure difference before and after the water heat exchanger 15, and a flow rate and the operating frequency of the pump 21b. The controller 17b transmits the measurement value of the temperature sensor 43b to the controller 17a at regular intervals. The controller 17b transmits the measurement values of the outlet pressure sensor 41b and the inlet pressure sensor 42b to the controller 17a at regular intervals. The controller 17b transmits information on the operating frequency of the compressor 11 to the controller 17a.

When an operation instruction for the heat source apparatus 10b is received from the controller 17a, the refrigeration cycle unit 73b controls the refrigeration cycle of the refrigerant circuit 18, in the same manner as the refrigeration cycle unit 73a. When an instruction for operation of the pump 21b is received from the controller 17a, the water pressure control unit 74b determines the water pressure difference from the measurement values of the outlet pressure sensor 41b and the inlet pressure sensor 42b. The water pressure control unit 74b calculates the flow rate from the determined water pressure difference, and controls the operating frequency of the pump 21b through the inverter circuit 24b such that the calculated flow rate reaches the target flow rate.

Additionally, in Embodiment 1, a description is given on a case where the controllers 17a, . . . , 17c are provided in the heat source apparatuses 10a, . . . , 10c, respectively, but the number of controllers may be one. In this case, the controller 17a may include the functions of the controllers 17b and 17c.

Figure 6:
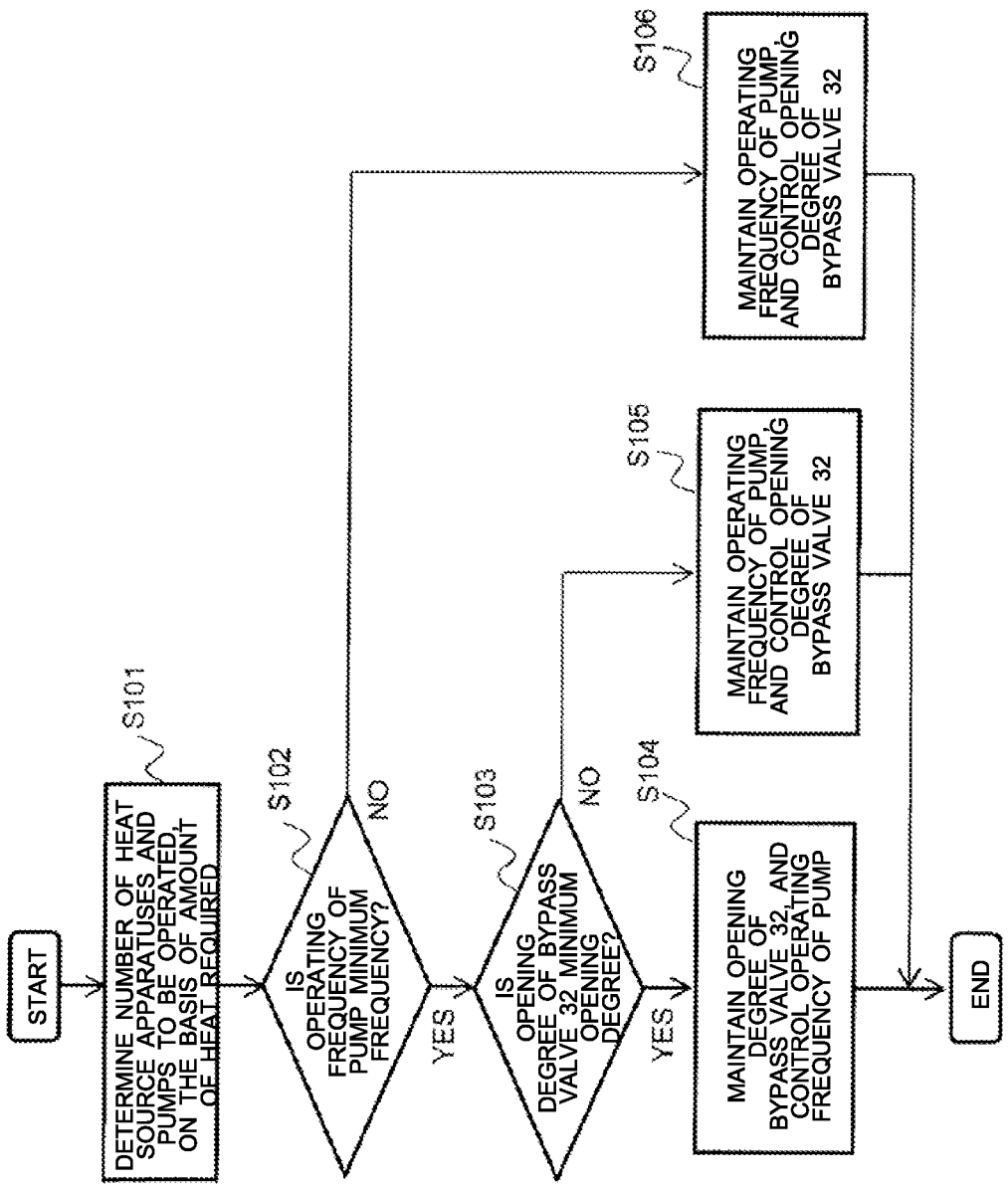
FIG. 6 is a flowchart showing an operation procedure of the heat source system according to Embodiment 1 of the present invention.

Next, an operation of the heat source system 100 of Embodiment 1 will be described. FIG. 6 is a flowchart showing an operation procedure of the heat source system according to Embodiment 1 of the present invention. In step S101, the controller 17a determines the number of heat source apparatuses to be operated, among the heat source apparatuses 10a, . . . , 10c, based on the amount of heat required for the load. Specifically, the controller 17a estimates the amount of heat that can be generated by each refrigerant circuit 18 of the heat source apparatuses 10a, . . . , 10c from the operating frequency of each compressor 11. Then, the controller 17a determines the number of heat source apparatuses to be operated, among the heat source apparatuses 10a, . . . , 10c, from the estimated amount of heat and the amount of heat required for the load. Then, the controller 17a causes the pump connected to the heat source apparatus to be operated, among the pumps 21a, . . . , 21c, to operate.

In the following, a description will be given on a case where the operation target heat source apparatus is the heat source apparatus 10a. The controller 17a controls the operating frequency of the compressor 11 such that the measurement value of the temperature sensor 43a reaches the target temperature. When determining, after the number of heat source apparatuses to be operated is determined, that the estimated amount of heat is not sufficient for the amount of heat required for the load, based on the measurement value acquired from the temperature sensor 43a, the controller 17a may increase the number of heat source apparatuses to be operated.

Next, the controller 17a determines, in the following manner, whether or not the operating frequency of the pump 21a is the minimum frequency (step S102). The controller 17a calculates the water pressure difference from the measurement values of the outlet pressure sensor 41a and the inlet pressure sensor 42a, and calculates a water flow rate of only the heat source apparatus 10a from the calculated water pressure difference. Subsequently, the controller 17a determines whether or not the calculated water flow rate is a lower limit value of a flow rate range of the heat source apparatus 10a. In the case where the water flow rate is the lower limit value of the flow rate range of the heat source apparatus 10a, the controller 17a determines that the operating frequency of the pump 21a is the minimum frequency.

Moreover, the controller 17a may determine whether or not the water flow rate is the lower limit value of the flow rate range of the heat source apparatus 10a, based on characteristics of the pump 21a. In the case where the result of determination indicates that the water flow rate is the lower limit value of the flow rate range of the heat source apparatus 10a, the controller 17a determines that the frequency of the pump 21a is the minimum frequency. In this case, the memory 71 of the controller 17a stores the flow rate range of water flowing through each of the water heat exchangers 15 of the heat source apparatuses 10a, ..., 10c, and characteristics of the pumps 21a, ..., 21c.

Here, a description will be made on the reason that the controller 17a determines whether or not the operating frequency of the pump 21a is the minimum frequency in step S102. A case where the operating frequency of the pump 21a is the minimum frequency is considered to be a state where the flow rate of water supplied to the load is small. In this case, a balance between a water pressure on a water supply side and a water pressure on a water return side has to be prevented from being greatly disturbed at the time of finely adjusting the water pressure difference at the bypass pipe 31. In step S102, the controller 17a selects, according to a result of determination, one of the operating frequency of the pump 21a and the opening degree of the bypass valve 32 as a device that finely adjusts the water pressure difference between the water supply side and the water return side.

In the case where the result of determination in step S102 indicates that the operating frequency of the pump 21a is the minimum frequency, the controller 17a determines whether the opening degree of the bypass valve 32 is the minimum opening degree or not (step S103). In the case where the result of determination in step S103 indicates that the opening degree of the bypass valve 32 is the minimum opening degree, the controller 17a maintains the opening degree of the bypass valve 32 at the minimum opening degree, and controls the frequency of the pump 21a such that the value of the differential pressure gauge 34 falls within the target range (step S104).

A description will be made on the reason why, in the case where the opening degree of the bypass valve 32 is the minimum opening degree, and the operating frequency of the pump 21a is the minimum frequency, the controller 17a finely adjusts the water pressure difference at the bypass pipe 31 by using the operating frequency of the pump 21a. Sensitivity of the opening degree of the bypass valve 32 to the water pressure difference between the water supply side and the water return side is high as compared to that of the operating frequency of the pump. A case where the opening degree of the bypass valve 32 is the minimum opening degree, and the operating frequency of the pump 21a is the minimum frequency is considered to be a state where a balance between the water pressure on the water supply side and the water pressure on the water return side is almost maintained. In this state, not to disturb the balance as much as possible, the operating frequency of the pump 21a with lower sensitivity than the opening degree of the bypass valve 32 is selected as the valve that adjusts the water pressure difference.

On the other hand, in the case where the result of determination in step S102 indicates that the operating frequency of the pump 21a is not the minimum frequency, the controller 17a maintains the operating frequency of the pump 21a, and controls the bypass valve 32 such that the value of the differential pressure gauge 34 falls within the target range (step S106). It is considered that a case where the operating frequency of the pump 21a is not the minimum frequency is not a state where the flow rate of water supplied to the load is small. In a state where a certain level of flow rate is secured, the water pressure difference may be more smoothly adjusted when the controller 17a controls the opening degree of the bypass valve 32 with high sensitivity to the water pressure difference between the water supply side and the water return side. When the controller 17a adjusts the water pressure difference between the water supply side and the water return side in step S106 based on the operating frequency of the pump, the operation frequency of the pump is possibly increased. In this case, the flow rate of water flowing to the load is increased.

When the opening degree of the bypass valve 32 is selected in step S106 as the valve that adjusts the water pressure difference, an increase in the operating frequency of the pump may be suppressed, and an increase in power consumption may be suppressed.

Moreover, in the case where the result of determination in step S103 indicates that the opening degree of the bypass valve 32 is not the minimum opening degree, the controller 17a maintains the operating frequency of the pump 21a at the minimum frequency, and controls the opening degree of the bypass valve 32 such that the value of the differential pressure gauge 34 falls within the target range (step S105).

In a case where the operating frequency of the pump is the minimum frequency, the flow rate of water supplied to the load is small, and the water pressure difference between the water supply side and the water return side is conceivably greatly changed when the controller 17a adjusts the opening degree of the bypass valve 32. However, the flow rate of water cannot be reduced when the operating frequency of the pump is controlled by the controller 17a. In contrast, the opening degree of the bypass valve 32 is not yet the minimum opening degree, and thus, there is room for finely adjusting the opening degree of the bypass valve 32. Accordingly, in step S105, the bypass valve 32, which can yet be finely adjusted to reduce the water pressure difference, is selected as the valve that adjusts the water pressure difference between the water supply side and the water return side.

The heat source system 100 of Embodiment 1 determines the necessary number of heat source apparatuses from the amount of heat generated by the heat source apparatuses 10a, ..., 10c and the amount of heat required, and determines whether or not the operating frequency of the pump connected to the heat source apparatus to be operated is the minimum frequency of the rated frequencies. Then, the heat source system 100 controls one of the operating frequency of the pump and the opening degree of the bypass valve 32 according to the result of determination such that the water pressure difference between the water supply side and the water return side falls within the target range.

According to Embodiment 1, the number of heat source apparatuses to be operated is determined from the required amount of heat, and thus, an unnecessary sensor is not required to be provided. Therefore, a worker is not required to perform work of attaching a pressure sensor or a flowmeter at the time of installing the heat source system 100, and also, a work space for the work becomes unnecessary. Furthermore, an installation cost for the attachment work for the pressure sensor or the flowmeter may be reduced, and the installation work may be shortened. As a result, an increase in an installation cost for the system may be suppressed. Moreover, according to Embodiment 1, one of the operating frequency of the pump and the opening degree of the bypass valve 32 is selected as the valve that adjusts the water pressure difference between the water supply side and the water return side, according to the result of determination of whether or not the operating frequency of the pump is the minimum frequency. As a result, fine adjustment of the water pressure difference between the water supply side and the water return side may be performed.

It is also conceivable to adjust the water pressure difference at the bypass pipe 31 by controlling only the opening degree of the bypass valve 32, while maintaining constant operating frequency of the pump. In this case, the balance of water pressure between the water supply side and the water return side is possibly greatly disturbed just by adjusting the opening degree of the bypass valve 32.

In contrast, with the heat source system 100 of Embodiment 1, in the case where the operating frequency of the pump is not the minimum frequency, the operating frequency of the pump is maintained, and the opening degree of the bypass valve 32 is controlled such that the water pressure difference between the water supply side and the water return side falls within the target range. In a state where a certain level of flow rate is secured, the water pressure difference may be more smoothly adjusted when the heat source system 100 controls the opening degree of the bypass valve 32 with high sensitivity to the water pressure difference between the water supply side and the water return side. Furthermore, when the opening degree of the bypass valve 32 is selected as the valve that adjusts the water pressure difference, an increase in the operating frequency of the pump may be suppressed, and an increase in power consumption may be suppressed.

Furthermore, in the case where the operating frequency of the pump is the minimum frequency, and the opening degree of the bypass valve 32 is the minimum opening degree, the heat source system 100 controls the operating frequency of the pump such that the water pressure difference between the water supply side and the water return side falls within the target range. In this case, the balance between the water pressure on the water supply side and the water pressure on the water return side is almost maintained, and disturbance in the balance may be suppressed as much as possible.

Moreover, in the case where the operating frequency of the pump is the minimum frequency, but the opening degree of the bypass valve 32 is not the minimum opening degree, the heat source system 100 maintains the operating frequency of the pump at the minimum frequency, and controls the opening degree of the bypass valve 32 such that the water pressure difference between the water supply side and the water return side falls within the target range. In this case, the opening degree of the bypass valve 32 is not yet the minimum opening degree, and thus, there is room for finely adjusting the opening degree of the bypass valve 32. Accordingly, the bypass valve 32, which can yet be finely adjusted to reduce the water pressure difference, may be selected as the valve that adjusts the water pressure difference between the water supply side and the water return side.

Embodiment 2

In Embodiment 2, a flow switch is provided on a water pipe connected to a load.

Figure 7:
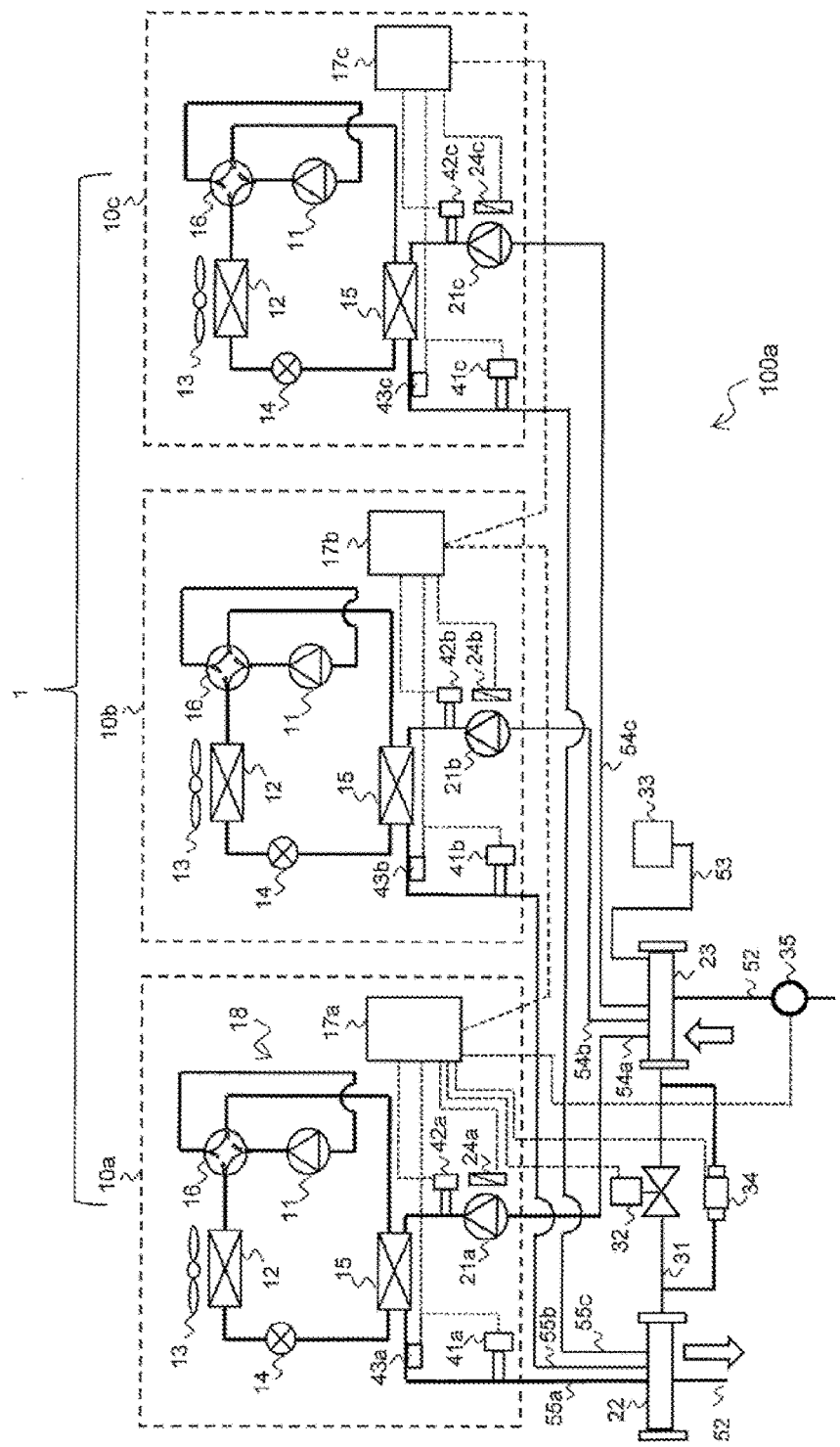
FIG. 7 is a circuit diagram showing an example configuration of a heat source system according to Embodiment 2 of the present invention.

A configuration of a heat source system of Embodiment 2 will be described. FIG. 7 is a circuit diagram showing an example configuration of the heat source system according to Embodiment 2 of the present invention. In Embodiment 2, a detailed description on a configuration similar to that in Embodiment 1 will be omitted.

As shown in FIG. 7, when compared with the configuration shown in FIG. 2, a heat source system 100a of Embodiment 2 includes a flow switch 35 that is provided on the water pipe 52 connected to the water return header pipe 23. The flow switch 35 is connected to the controller 17a by a signal line. The flow switch 35 outputs a detection signal indicating whether or not water is flowing through the water pipe 52. In the case where water is flowing through the water pipe 52, the flow switch 35 outputs a detection signal "off signal" to the controller 17a. In the case where water is not flowing through the water pipe 52, the flow switch 35 outputs a detection signal "on signal" to the controller 17a.

In the case where the on signal is received by the controller 17a from the flow switch 35, the number control unit for apparatuses 75 stops operation of the compressors 11 of the heat source apparatuses 10a, . . . , 10c. Then, the number control unit for apparatuses 75 causes one pump among the pumps 21a, . . . , 21c to operate, and stops the other pumps. At this time, the number control unit for apparatuses 75 may set the operating frequency of the operation target pump to the minimum frequency. Furthermore, in the case where the on signal is received by the controller 17a from the flow switch 35, the water pressure control unit 74a controls the opening degree of the bypass valve 32 such that the water pressure difference measured by the differential pressure gauge 34 falls within the target range.

Figure 8:
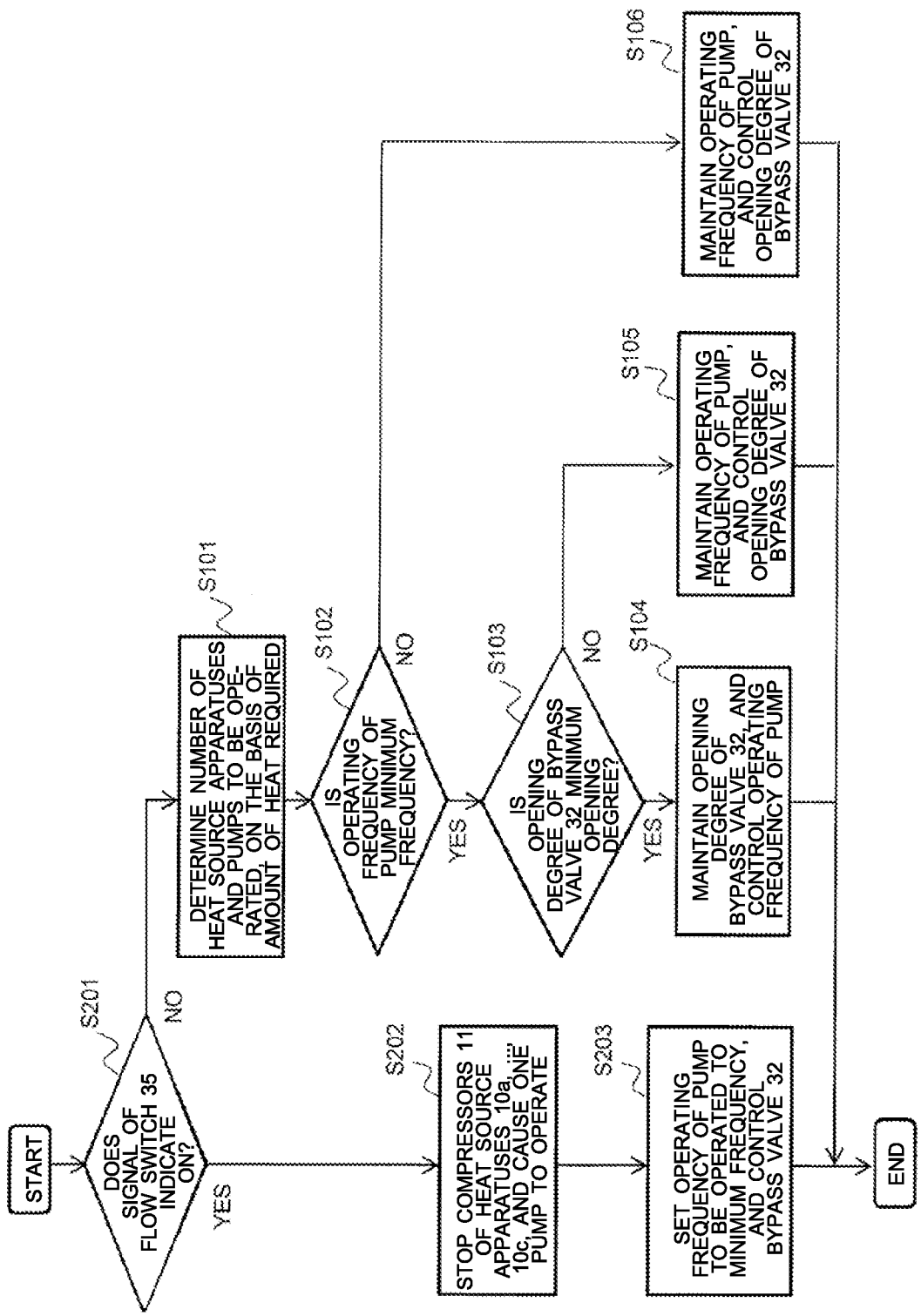
FIG. 8 is a flowchart showing an operation procedure of the heat source system according to Embodiment 2 of the present invention.

Next, an operation of the heat source system 100a of Embodiment 2 will be described. FIG. 8 is a flowchart showing an operation procedure of the heat source system according to Embodiment 2 of the present invention. Steps S101, . . . , S106 shown in FIG. 8 are processes similar to those described with reference to FIG. 6, and a detailed description thereon will be omitted.

The controller 17a determines whether the detection signal acquired from the flow switch 35 indicates an on state or an off state (step S201) at regular intervals. In the case where the result of determination indicates that the detection signal indicates the off state, the controller 17a proceeds to step S101. On the other hand, in the case where the result of determination in step S201 indicates that the detection signal indicates the on state, the controller 17a stops operation of the compressors 11 of the heat source apparatuses 10a, . . . , 10c, and causes one pump among the pumps 21a, . . . , 21c to operate and stops the other pumps (step S202). Next, the controller 17a sets the operating frequency of the one pump in operation to the minimum frequency. Furthermore, the controller 17a controls the opening degree of the bypass valve 32 such that the water pressure difference measured by the differential pressure gauge 34 falls within the target range (step S203).

In the case where water is not flowing to the load in the configuration described in Embodiment 1, the heat source system 100a of Embodiment 2 stops the heat source apparatuses 10a, . . . , 10c, causes one pump to operate, and causes water to circulate through the load and the heat source apparatuses 10a, . . . , 10c through the water pipes. According to Embodiment 2, when water stops flowing to the load side, each compressor 11 of the heat source apparatuses 10a, . . . , 10c is stopped, and thus, an increase in power consumption is suppressed.

Embodiment 3

Embodiment 3 is different from Embodiment 1 relative to the position where the differential pressure gauge 34 is provided.

Figure 9:
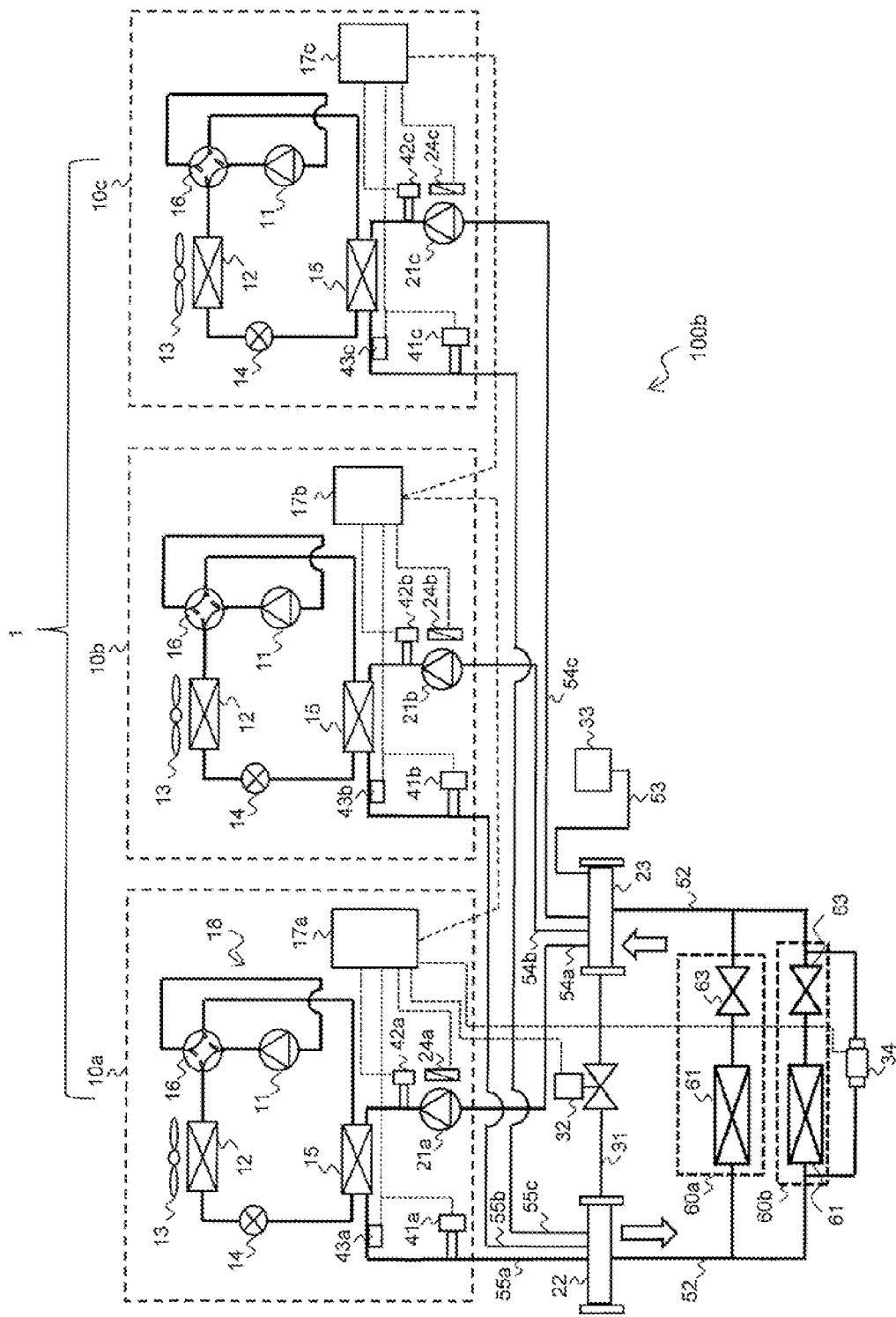
FIG. 9 is a circuit diagram showing an example configuration of a heat source system according to Embodiment 3 of the present invention.

A configuration of a heat source system of Embodiment 3 will be described. FIG. 9 is a circuit diagram showing an example configuration of the heat source system according to Embodiment 3 of the present invention. In Embodiment 3, a detailed description of a configuration similar to that in Embodiment 1 will be omitted.

As shown in FIG. 9, when compared with the configuration shown in FIG. 1, a heat source system 100b of Embodiment 3 is provided with the differential pressure gauge 34 at the fan coil unit 60b with a greatest distance from the heat source apparatuses 10a, . . . , 10c, among the plurality of fan coil units 60a and 60b. With the example configuration shown in FIG. 9, when a distance between the fan coil unit 60b and the heat source apparatuses 10a, ..., 10c and a distance between the fan coil unit 60a and the heat source apparatuses 10a, ..., 10c are compared, the distance of the fan coil unit 60b is greater than the distance of the fan coil unit 60a.

The differential pressure gauge 34 is connected in parallel with the fan coil unit 60b. The differential pressure gauge 34 measures the water pressure difference between the water supply header pipe 22 side of the heat exchanger 61 and the water return header pipe 23 side of the on-off valve 63.

Additionally, an operation of the heat source system 100b of Embodiment 3 is similar to the operation described in Embodiment 1 with reference to FIG. 6, and a detailed description thereof will be omitted.

Among a plurality of loads, a flow of water that is supplied is slower for a load with a greatest distance from the heat source apparatuses 10a, ..., 10c, compared with other loads. Accordingly, the water pressure difference between a water supply header side and a water return header side is the smallest at the load with the greatest distance from the heat source apparatuses 10a, ..., 10c. With the heat source system 100b of Embodiment 3, the differential pressure gauge 34 is provided at the load with the greatest distance from the heat source apparatuses 10a, ..., 10c, among a plurality of loads. Moreover, the heat source system 100b adjusts the water pressure difference between the water supply side and the water return side such that the measurement value of the differential pressure gauge 34 falls within the target range. Accordingly, the water pressure difference between the water supply side and the water return side falls within the target range at the load with the greatest distance from the heat source apparatuses 10a, ..., 10c, and water is supplied at a sufficient flow rate. Furthermore, water is also supplied at a sufficient flow rate to a load closer than the load with the greatest distance from the heat source apparatuses 10a, ..., 10c.

Embodiment 4

Embodiment 4 is a combination of Embodiment 2 and Embodiment 3.

Figure 10:
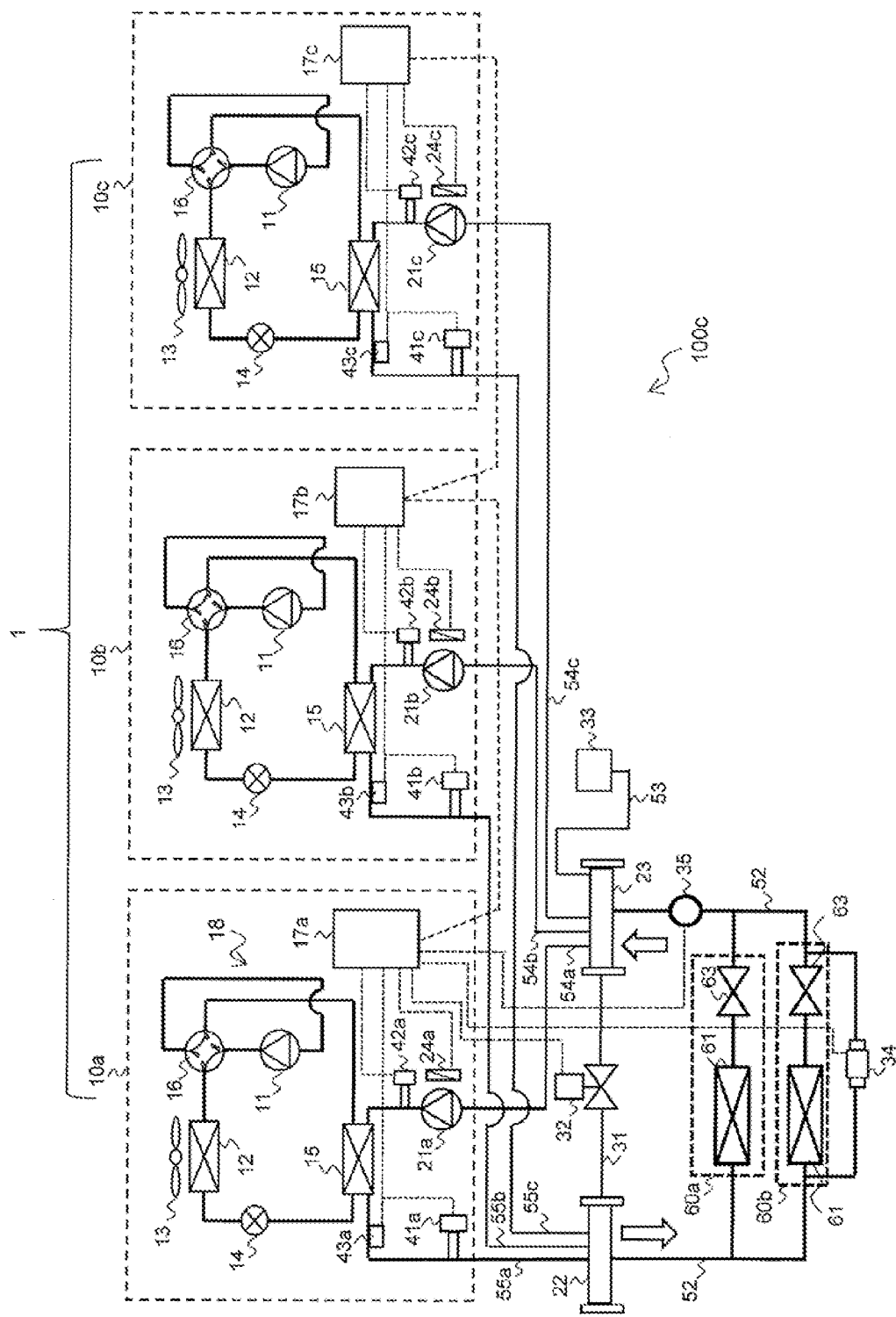
FIG. 10 is a circuit diagram showing an example configuration of a heat source system according to Embodiment 4 of the present invention.

A configuration of a heat source system of Embodiment 4 will be described. FIG. 10 is a circuit diagram showing an example configuration of the heat source system according to Embodiment 4 of the present invention. In Embodiment 4, a detailed description of configurations similar to those in Embodiments 1, ..., 3 will be omitted.

As shown in FIG. 10, when compared with the configuration shown in FIG. 2, the heat source system 100c of Embodiment 4 is provided with the flow switch 35 at the water pipe 52 connected to the water return header pipe 23. Furthermore, when compared with the configuration shown in FIG. 1, the heat source system 100c of Embodiment 4 is provided with the differential pressure gauge 34 at the fan coil unit 60b with the greatest distance from the heat source apparatuses 10a, ..., 10c, among a plurality of fan coil units 60a and 60b.

Additionally, an operation of the heat source system 100c of Embodiment 4 is similar to the operation of Embodiment 2 described with reference to FIG. 8, and a detailed description thereof will be omitted.

With the heat source system 100c of Embodiment 4, the differential pressure gauge 34 is provided at the load with the greatest distance from the heat source apparatuses 10a, ..., 10c, and in the case where water does not flow to the load side, the heat source apparatuses 10a, ..., 10c are stopped, and one pump is operated to circulate water. According to Embodiment 4, advantageous effects of each of Embodiments 2 and 3 may be achieved, in addition to effects similar to those of Embodiment 1.

REFERENCE SIGNS LIST 1 refrigeration cycle apparatus 10a, ..., 10c heat source apparatus 11 compressor 12 air heat exchanger 13 fan 14 expansion valve 15 water heat exchanger 16 four-way valve 17a, ..., 17c controller 18 refrigerant circuit 20 water return header pipe 21a, ..., 21c pump 22 water supply header pipe 23 water return header pipe 24a, ..., 24c inverter circuit 25 water return header pipe 31 bypass pipe 32 bypass valve 33 tank 34 differential pressure gauge 35 flow switch 41a, ..., 41c outlet pressure sensor 42a, ..., 42c inlet pressure sensor 43a, ..., 43c temperature sensor 51, ..., 53, 54a, ..., 54c, 55a, ..., 55c water pipe 60, 60a, 60b fan coil unit 61 heat exchanger 62 fan 63 on-off valve 71 memory 72 CPU 73a, 73b refrigeration cycle unit 74a, 74b water pressure control unit 75 number control unit for apparatuses 100, 100a, ..., 100c heat source system

The invention claimed is:

1. A heat source system comprising:
a plurality of heat source apparatuses each including a refrigerant circuit including a water heat exchanger;
a water supply header pipe, connected to a load and a plurality of the water heat exchangers by water pipes, and configured to merge and supply, to the load, water flowing in from the plurality of water heat exchangers;
a water return header pipe, connected to the load and the plurality of water heat exchangers by water pipes, and configured to split, into the plurality of water heat exchangers, water flowing in from the load;
a plurality of pumps, provided on the water pipes connecting the plurality of water heat exchangers and the water return header pipe, and configured to feed water to the plurality of water heat exchangers;
a bypass pipe configured to connect the water supply header pipe and the water return header pipe;
a bypass valve provided on the bypass pipe;
a differential pressure gauge configured to measure a water pressure difference between pressure of water supplied to the load from the water supply header pipe and pressure of water returning from the load to the water return header pipe; and
a controller configured to control the plurality of heat source apparatuses and the plurality of pumps,
wherein the controller
determines the number of heat source apparatuses to be operated, among the plurality of heat source apparatuses, from an amount of heat generated by a plurality of the refrigerant circuits and an amount of heat required, and
determines whether or not an operating frequency of the pump connected to the heat source apparatus to be operated is a minimum frequency of rated frequencies, maintains the operating frequency of the pump in a case where the result of the determination indicates that the operating frequency of the pump is not the minimum frequency, and controls, according to a result of determination, an opening degree of the bypass valve such that the water pressure difference falls within a target range, wherein the controller is connected to a flow switch configured to output a detection signal indicating whether or not water is flowing to the load, and in a case where the detection signal indicates that water is not flowing to the load, the controller stops operation of the plurality of heat source apparatuses, causes one pump among the plurality of pumps to operate, and stops other pumps, and the controller controls the opening degree of the bypass valve such that the water pressure difference falls within the target range.

2. The heat source system of claim 1, wherein the controller is further configured to, in a case where the result of determination indicates that the operating frequency of the pump is the minimum frequency, determine whether or not the opening degree of the bypass valve is a minimum opening degree, and then in a case where the opening degree of the bypass valve is determined to be the minimum opening degree, control the operating frequency of the pump, and in a case where the opening degree of the bypass valve is determined to be not the minimum opening degree, control the opening degree of the bypass valve.

3. The heat source system of claim 1, wherein a plurality of the loads are connected in parallel with the water supply header pipe and the water return header pipe, and the differential pressure gauge is connected in parallel with a load, among the plurality of loads, with a greatest distance downstream, relative to water circulating through the water pipes, from the plurality of heat source apparatuses.

\* \* \* \* \*